UNITED STATES PATENT OFFICE.

SAMUEL DUNSEITH, OF PHILADELPHIA, PENNSYLVANIA.

IMPROVED COMPOSITION FOR TANNING.

Specification forming part of Letters Patent No. 43,188, dated June 21, 1864.

*To all whom it may concern:*

Be it known that I, SAMUEL DUNSEITH, of Philadelphia, Pennsylvania, have invented a new Composition for Tanning Skins and Hides; and I do hereby declare the following to be a full, clear, and exact description of the same.

My invention consists of a liquid compounded of the materials and in the manner substantially as described hereinafter, for the purpose of tanning skins and hides more rapidly, thoroughly, and economically than by the usual tanning materials.

In order to enable others to practice my invention, I will now proceed to describe the manner of carrying it into effect.

The skins to be tanned by my composition are in the first instance treated in the usual manner adopted by practical tanners.

My tanning composition is prepared as follows: I take forty pounds of the plant known as the "golden-rod," (*Solidago*,) of which there are many species indigenous to the United States, and boil it in about forty gallons of soft water, until a thorough decoction of the plant is produced. I then take two hundred pounds of the drug known as "catechu" or of "cutch," and dissolve it in the above decoction. I then take twenty-five pounds of common salt, three pounds of alum, and three pounds of crude niter, and deposit it in a separate vessel containing as much of the golden-rod decoction as is necessary to dissolve the whole. I then mix this solution with the above-mentioned forty gallons of the decoction of golden-rod combined with the cutch, the quantity of liquor produced by compounding the ingredients in the proportions above mentioned being sufficient to tan two hundred calf-skins.

The composition is then stirred repeatedly for four or five days, when it is ready for being used in the following manner: In the first instance the vats to receive the hides are filled to about two-thirds of their capacity with a strong decoction of golden-rod, and as much of the above-described tanning-liquor is added as will raise the decoction to about fifteen degrees barkometer standard, when the process of tanning is commenced, as much as two degrees being added to the strength each day until the tanning is completed. The skins or hides should be handled every hour, and raised from and lowered into the vat during the first and second days, in order to secure a light-colored leather and an even grain. After this the hides must be handled twice a day until the tanning is completed. During the tanning process the skins should be removed from the vat when they are about half-tanned and subjected to the currier's knife, or split, and then returned to the vats.

Calf-skins and kips can be tanned in from eight to fourteen days, according to the thickness of the hide, and cow-skins and ox-skins can be tanned in from twenty to ninety days.

The golden-rod, which forms one of the main ingredients in my tanning-liquor, grows in abundance throughout the United States, there being a number of species, any or all of which can be used as an ingredient in my composition. I have found the sweet-scented golden-rod, (*Solidago odora*,) as well as the *Solidago memoralis*, to be especially useful in preparing my composition.

The above directions for carrying out my invention have been prepared as the result of lengthened and very careful experiments.

I do not desire to claim separately the use of the materials herein named in a composition for tanning; but

I claim as my invention and desire to secure by Letters Patent—

A tanning-liquor composed of the ingredients herein described, when prepared and used in the manner specified.

In testimony whereof I have signed my name to this specification in the presence of two subscribing witnesses.

SAMUEL DUNSEITH.

Witnesses:
   HENRY HOWSON,
   CHARLES HOWSON.